United States Patent
Artemev

(10) Patent No.: US 10,207,763 B2
(45) Date of Patent: Feb. 19, 2019

(54) USAGE DETECTION SYSTEM FOR A SELF-BALANCING POWERED UNICYCLE DEVICE

(71) Applicant: Timur Artemev, Haslemere Surrey (GB)

(72) Inventor: Timur Artemev, Haslemere Surrey (GB)

(*) Notice: Subject to any disclaimer, the term of this patent is extended or adjusted under 35 U.S.C. 154(b) by 0 days.

(21) Appl. No.: 15/116,433

(22) PCT Filed: Feb. 2, 2015

(86) PCT No.: PCT/GB2015/050267
§ 371 (c)(1),
(2) Date: Aug. 3, 2016

(87) PCT Pub. No.: WO2015/118310
PCT Pub. Date: Aug. 13, 2015

(65) Prior Publication Data
US 2017/0008593 A1    Jan. 12, 2017

(30) Foreign Application Priority Data

Feb. 4, 2014 (GB) .................................. 1401887.3
Feb. 4, 2014 (GB) .................................. 1401914.5
(Continued)

(51) Int. Cl.
*B62K 1/00* (2006.01)
*B62K 11/00* (2006.01)
(Continued)

(52) U.S. Cl.
CPC ............ *B62K 11/007* (2016.11); *B60L 3/106* (2013.01); *B60L 11/005* (2013.01); *B60L 11/16* (2013.01);
(Continued)

(58) Field of Classification Search
CPC ...... B60K 11/007; B60K 1/00; B60L 2260/34
See application file for complete search history.

(56) References Cited

U.S. PATENT DOCUMENTS 4,109,741 A    8/1978 Gabriel
6,302,230 B1 * 10/2001 Kamen ................. A63C 17/01
                                                180/171
(Continued)

FOREIGN PATENT DOCUMENTS

AU    2004200265 A1    2/2004
CN       2820682 Y      9/2006
(Continued)

OTHER PUBLICATIONS

International Search Report and Written Opinion of the International Search Authority (forms PCT/ISA/210 and PCT/ISA/237) for International Application No. PCT/GB2015/050267 dated Apr. 24, 2015 (8 pages).

(Continued)

*Primary Examiner* — James A English
(74) *Attorney, Agent, or Firm* — Withrow & Terranova, P.L.L.C.; Vincent K. Gustafson

(57) ABSTRACT

A usage detection system for a self-balancing powered unicycle is disclosed. The usage detection system is adapted to detect an indication of intended usage from a user and to provide an indication of intended usage. The indication of intended usage comprises manipulation of the overall unicycle device resulting from preparatory action taken by the user prior to the onset of the intended usage. Operation of the powered unicycle may thus be controlled based on an indication of intended usage from the usage detection system.

9 Claims, 15 Drawing Sheets

(30) Foreign Application Priority Data

Sep. 3, 2014 (GB) .................................. 1415609.5
Jan. 7, 2015 (GB) .................................. 1500186.0

(51) Int. Cl.

| | | |
|---|---|---|
| B60L 3/10 | (2006.01) | |
| B60L 11/00 | (2006.01) | |
| B60L 11/16 | (2006.01) | |
| B60L 11/18 | (2006.01) | |
| B60L 15/20 | (2006.01) | |
| B62J 25/00 | (2006.01) | |
| B62K 23/00 | (2006.01) | |

(52) U.S. Cl.

CPC ....... B60L 11/1864 (2013.01); B60L 11/1877 (2013.01); B60L 11/1879 (2013.01); B60L 15/20 (2013.01); B62J 25/00 (2013.01); B62K 1/00 (2013.01); B62K 23/00 (2013.01); B60L 2200/16 (2013.01); B60L 2220/44 (2013.01); B60L 2220/50 (2013.01); B60L 2240/421 (2013.01); B60L 2240/423 (2013.01); B60L 2260/34 (2013.01); B60L 2270/145 (2013.01); Y02T 10/641 (2013.01); Y02T 10/645 (2013.01); Y02T 10/7005 (2013.01); Y02T 10/7022 (2013.01); Y02T 10/7061 (2013.01); Y02T 10/72 (2013.01); Y02T 10/7275 (2013.01)

(56) References Cited

U.S. PATENT DOCUMENTS

| | | | | |
|---|---|---|---|---|
| 9,376,154 | B2* | 6/2016 | Mori | .................. B62D 51/001 |
| 9,789,924 | B2* | 10/2017 | Kroymann | ............. B62K 13/04 |
| 2002/0063006 | A1 | 5/2002 | Kamen et al. | |
| 2009/0105908 | A1* | 4/2009 | Casey | .................... A63C 17/08 |
| | | | | 701/41 |
| 2010/0030440 | A1* | 2/2010 | Kosaka | ................ G05D 1/0891 |
| | | | | 701/70 |
| 2011/0067937 | A1 | 3/2011 | Gomi et al. | |
| 2011/0220427 | A1 | 9/2011 | Chen | |
| 2012/0035809 | A1* | 2/2012 | Kosaka | .................. A63C 17/12 |
| | | | | 701/41 |
| 2012/0166049 | A1 | 6/2012 | Akimoto et al. | |
| 2012/0175176 | A1 | 7/2012 | Hamaya et al. | |
| 2012/0243822 | A1 | 9/2012 | Kobori et al. | |
| 2012/0323450 | A1* | 12/2012 | Takeuchi | ............. B62K 11/007 |
| | | | | 701/49 |
| 2014/0297125 | A1* | 10/2014 | Araki | ................... G05D 1/0268 |
| | | | | 701/41 |
| 2015/0175202 | A1* | 6/2015 | MacGregor | .......... G05D 1/0011 |
| | | | | 701/2 |

FOREIGN PATENT DOCUMENTS

| | | |
|---|---|---|
| CN | 102414077 A | 4/2012 |
| CN | 103332245 A | 10/2013 |
| CN | 103407528 A | 11/2013 |
| CN | 103407529 A | 11/2013 |
| CN | 203268232 U | 11/2013 |
| CN | 203473073 U | 3/2014 |
| EP | 2783959 A1 | 10/2014 |
| JP | 2011-068165 A | 4/2011 |
| JP | 2011-164040 A | 8/2011 |
| KR | 2007-0107506 A | 11/2007 |
| KR | 100789906 B1 | 1/2008 |
| WO | 00-75001 A1 | 12/2000 |
| WO | 2012-017335 A1 | 2/2012 |
| WO | 2014-064887 A1 | 5/2014 |

OTHER PUBLICATIONS

Search Report under Section 17(5) for United Kingdom Patent Application No. GB1401887.3 dated Jul. 23, 2014 (3 pages).
Search Report under Section 17(5) for United Kingdom Patent Application No. GB1401914.5 dated Jul. 23, 2014 (4 pages).
Search Report under Section 17(5) for United Kingdom Patent Application No. GB1415609.5 dated Feb. 25, 2015 (5 pages).
Search Report under Section 17(5) for United Kingdom Patent Application No. GB1500186.0 dated Jul. 8, 2015 (3 pages).
First Office Action for Chinese Patent Application No. 201580017486.2, dated May 28, 2018 (15 pages including English translation).
First Office Action for Chinese Patent Application No. 201580007239.4, dated May 28, 2018 (13 pages including English translation).
Examination Report for European Patent Application No. 15709535.7, dated Jan. 12, 2018, 5 pages.
Communication Pursuant to Article 94(3) EPC for European Patent Application No. 15709535.7, dated Oct. 9, 2018, 6 pages.

* cited by examiner

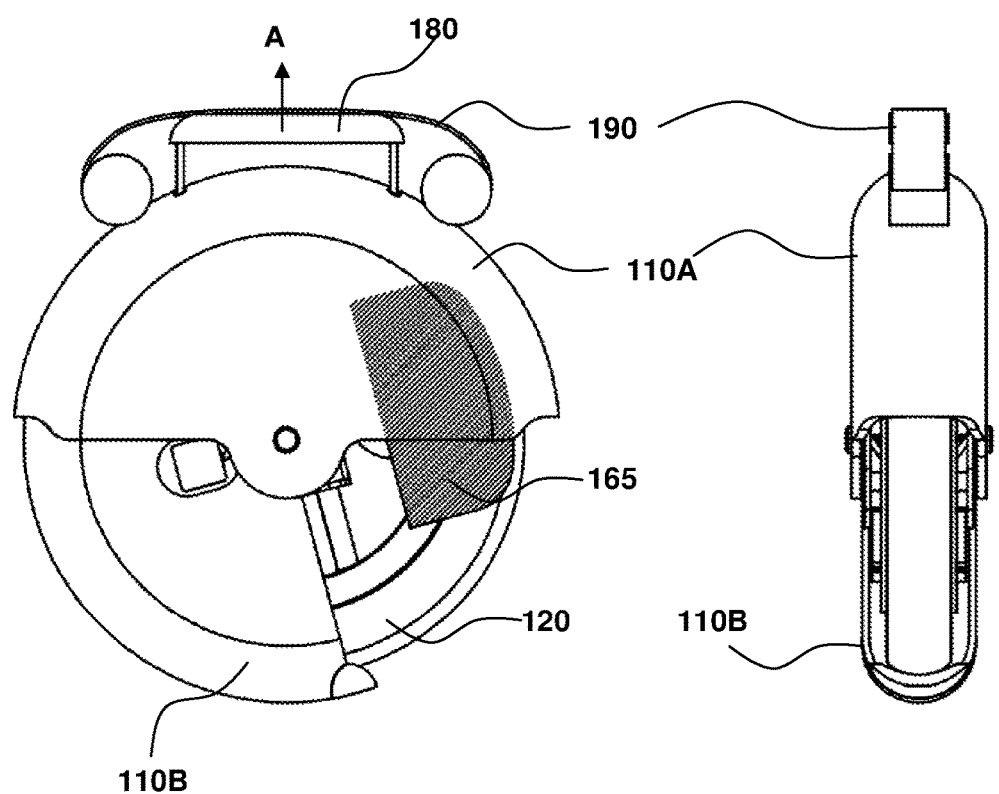
FIG. 11A  FIG. 11B

USAGE DETECTION SYSTEM FOR A SELF-BALANCING POWERED UNICYCLE DEVICE

CROSS-REFERENCE TO RELATED APPLICATIONS

This application is a 35 U.S.C. § 371 national phase filing of International Application No. PCT/GB2015/050267 filed Feb. 2, 2015, and claims the benefit of United Kingdom Patent Application No. 1401887.3 filed Feb. 4, 2014, United Kingdom Patent Application No. 1401914.5 filed Feb. 4, 2014, United Kingdom Patent Application No. 1415609.5 filed Sep. 3, 2014, and United Kingdom Patent Application No. 1500186.0 filed Jan. 7, 2015. The entire disclosures of the foregoing applications are hereby incorporated by reference herein in their respective entireties.

FIELD OF INVENTION

The present invention relates to powered single-wheeled devices and more particularly to powered unicycles with self-balancing functionality.

BACKGROUND TO THE INVENTION

Powered self-balancing vehicles for use while standing are known. Such vehicles include two-wheeled vehicles and single-wheeled vehicles (i.e. unicycles).

In a powered self-balancing unicycle, an electronic or mechanical system that controls the wheel in the appropriate direction is typically used to achieve fore-and-aft balance. This type of automatic fore-and-aft balance technology is well known and described, for example, in U.S. Pat. No. 6,302,230. A sensor and electronic equipment are typically provided. Information detected by the sensor and the electronics is relayed to a motor. The motor drives the wheel in the appropriate direction and at sufficient speed to maintain fore-and-aft balance.

Known embodiments of a powered self-balancing unicycle do not include a handle bar supported by a shaft. For example, U.S. patent application Ser. No. 12/281,101 presents a single wheel, coupled to a frame to which two platforms (one on each side of the wheel) are attached.

SUMMARY OF THE INVENTION

According to a first aspect of the invention, there is provided a self-balancing powered unicycle device comprising: a single wheel; a drive arrangement adapted to drive the wheel; a balance control system adapted to maintain fore-aft balance of the unicycle device; at least one foot platform for supporting a user of the unicycle device; a usage detection system adapted to detect an indication of intended usage from a user and to provide an indication of intended usage; and a control system adapted to control operation of the unicycle based on the indication of intended usage from the usage detection system wherein the indication of intended usage comprises manipulation of the overall unicycle device resulting from preparatory action taken by the user prior to the onset of the intended usage.

There is proposed a self-balancing powered unicycle comprising usage detection system that is arranged to detect an indication of intended usage provided by a user manipulating the overall unicycle device as a result of preparatory action prior to the intended usage. Based on a detected indication of intended usage, the operation of the unicycle may be controlled. In other words, the unicycle may be adapted to alter or change a mode of operation depending on whether or not a user intends to use the unicycle. For example, operation of a drive arrangement of the unicycle may be permitted (e.g. powered) when a user lifts the unicycle and lowers it towards the ground. By way of further example, operation of a drive arrangement may be disabled when a user alights from the unicycle and lifts it from the ground. Thus, embodiments may be adapted to control, change, alter or modify one or more operations, processes or procedures of a self-balancing powered unicycle, and this can be based on a detected indication of intended usage provided by a user manipulating the overall unicycle device.

Thus, embodiments may provide a self-balancing powered unicycle that is devoid of any user input interfaces (such as buttons, switches, levers, touch-sensitive screens, etc.) which a user would otherwise be required to operate or manipulate in order to indicate their intended use of the unicycle. For example, unlike conventional self-balancing powered unicycles, embodiments may not have an on/off switch/button for turning the unicycle on or off. Instead, embodiments may detect, from user manipulation of the overall unicycle device, that a user's intends to use the device and then turn on the drive arrangement and/or balance control system for example.

Embodiments may therefore be adapted to infer a user's intended usage of a self-balancing powered unicycle from manipulation of the overall unicycle device (resulting from preparatory action taken by the user prior to the onset of the intended usage). Examples of manipulation of the overall unicycle device resulting from preparatory action taken by the user prior to the onset of the intended usage may include: the unicycle being picked up or lifted by the user; the unicycle being shaken at a predetermined frequency; the unicycle being orientated to a predetermined orientation (such as vertical for example); and/or the unicycle being manipulated in accordance with a predetermined sequence of actions (such as opening the casing, and subsequently unfolding/deploying the foot platform(s), for example).

The usage detection system may, for example, provide an indication that a user is present on the unicycle and wishes to use the unicycle device. Embodiments may therefore allow for rapid deployment by being adapted to automatically activate a drive arrangement and/or the balance control system of the unicycle when a user stands on the unicycle. Similarly, embodiments may enable rapid disablement by being adapted to automatically de-activate a drive arrangement and/or the balance control system of the unicycle when a user dismounts from the unicycle. Such automatic activation/de-activation may provide power savings, and may also improve device safety by altering operation (e.g. stopping the motor from turning the wheel) when a user alights the unicycle (intentionally or accidentally).

A usage detection system of a proposed embodiment may provide an indication or signal which is used by a control system to alter operation of the unicycle upon occurrence of one or more predetermined conditions indicating a use's intended usage of the unicycle. Such embodiments may therefore enable quick and easy deployment from an off configuration (wherein the rotation of the wheel is disabled, for example) to an on configuration (wherein rotation of the wheel is enabled, for example). This deployment may require little or no input from the user, but instead may be automatically achieved when the user is in close proximity with, or contacts) one or more predetermined parts of the unicycle, or when the user manipulates the overall unicycle in a predetermined manner for example.

Embodiments may enable the powered unicycle to automatically disable if the user alights or dismounts from the unicycle (e.g. by intentionally stepping off the foot platform(s) or by falling off). The usage detection system may therefore facilitate multiple functions, including the provision of an automatic power saving mode, the provision of quick start-up/deployment, and the provision of an automatic-shutdown safety feature. The usage detection system may thus provide not only for improved user interaction, but also for improved safety and to protect the unicycle.

The usage detection system may comprise one or more proximity sensors adapted to detect the existence of an entity in close proximity with the proximity sensor. Further, at least one of the one or more proximity sensors may employ at least one of: infrared reflection; ultrasonic sensing; microwave sensing; pressure sensing; temperature sensing; capacitive sensing; and light detection to detect the existence of an entity in close proximity with the proximity sensor.

An embodiment may further comprise a handle for lifting the unicycle. Such a handle may be used to hold the unicycle above the ground, for example to enable a user to lift, carry, convey or place the unicycle. The handle (or a portion of the unicycle close to the handle) may also comprise part of the usage detection system so that the manipulation of the unicycle via the handle may be used to provide an indication of intended usage and thus control operation of the powered unicycle. For example, the handle may comprise a proximity sensor and/or accelerometers.

An embodiment may further comprise a casing adapted to cover at least a portion of the outer rim of the wheel, and the casing may comprise a proximity sensor.

According to another embodiment, the entity presence detection system may comprise a load sensing system adapted to determine a loading applied to at least one part of the powered unicycle. Further, the load sensing system may be adapted to determine at least one of: a deflection of the wheel axel; a compressive force applied to the wheel axel; a force applied to a handle or lifting portion of the unicycle device; a deflection of the at least one foot platform; a tensile force applied to the at least one foot platform; and a compressive force applied to the at least one foot platform, so as determine a loading applied to at least part of the powered unicycle. In such embodiments, operation of the unicycle may be based on a value of the loading applied to one or more of its parts. For example, for a heavier user exerting a greater load on the unicycle, the drive arrangement may be adapted to provide extra power for rotating the wheel. Conversely, for a small/lightweight user exerting a lower load on the unicycle, the drive arrangement may be adapted provide reduced power so as to ensure the wheel rotates within a desired speed range (and not too quickly for example) and/or to conserve power/energy.

In some embodiments, the usage detection system may comprise a processing unit adapted to process signals in accordance with an algorithm to determine a user's intended usage of the unicycle device. By way of example, such an algorithm may be adapted to determine if the signals from the drive arrangement, the at least one foot platform, the usage detection system and/or the balance control system exhibit a predetermined characteristic indicating a user's intended usage of the unicycle device.

The signals from the drive arrangement and/or the balance control system may comprise information relating to at least one of: casing orientation; inclination or angle of a part of the unicycle; value of compressive force applied to at least part of a foot platform; accelerometer data; gyroscope data; motor torque; speed of wheel rotation; current; motor temperature, distance travelled, time of journey; battery parameters; and a motor drive voltage.

According to yet another embodiment, the entity presence detection system may comprise a vibration sensor adapted to detect a frequency of vibration of at least one part of the powered unicycle. The entity presence detection system may be adapted to determine an intended usage of the unicycle device if a detected frequency of vibration of at least one part of the powered unicycle is within a predetermined range. For example, an embodiment may be adapted to turn-on if it detected that the user is shaking the unicycle device at a predetermined frequency. Such embodiments may be thought of as providing a 'shake to activate' functionality.

In embodiments, the usage detection system may be adapted to detect the indication of intended usage based on if the user manipulates the overall unicycle device in accordance with a predetermined pattern of movement. For example, the usage detection system may determine that the user intends to use the unicycle device by detecting that user is holding the unicycle in an upright configuration and alternately spinning/rotating the unicycle left and right (e.g. alternatively rotating the unicycle clockwise and anti-clockwise when viewed from directly above). Such embodiments may thus enable a user to control operation of the unicycle by performing one or more gestures and/or movements with the unicycle.

Thus, there is proposed the concept of a self-balancing powered unicycle is devoid of a switch, button or input interface adapted to receive an indication of usage from the user. Instead of requiring a user to operate one or more input interfaces, embodiments can appear to be absent or free of any user input interfaces that are specifically adapted to receive input commands via a physically manipulated portion or surface of the unicycle device. In other words, embodiments may be adapted to infer an intended usage from a user's manipulation of the overall device which results from action taken by the user as part of preparing for the intended usage. The onset of a predetermined manipulation of the overall unicycle device may indicate a certain intended usage, and then cessation or removal of the predetermined manipulation may indicate a different intended usage (such as the ending the previously intended usage).

According to another aspect of the invention, there is provided a usage detection system for a self-balancing powered unicycle wherein the usage detection system is adapted to detect an indication of intended usage from a user and to provide an indication of intended usage, and wherein the indication of intended usage comprises manipulation of the overall unicycle device resulting from preparatory action taken by the user prior to the onset of the intended usage.

Embodiments may comprise one or more proximity sensors adapted to detect the existence of an entity in close proximity with the proximity sensor.

Embodiments may be further adapted to be integrated into a handle of a self-balancing powered unicycle.

An embodiment may comprise a load sensing system adapted to determine a loading applied to at least one part of a self-balancing powered unicycle.

Some embodiments may comprise a processing unit adapted to process signals in accordance with an algorithm to determine a user's intended usage of the self-balancing powered unicycle.

In an embodiment, the entity presence detection system may comprise a vibration sensor adapted to detect a frequency and/or amplitude of vibration of at least one part of a self-balancing powered unicycle.

For the avoidance of doubt, reference to a single wheel should be taken to mean the generally circular unit that is positioned between the legs of a user and adapted to rotate about an axis to propel the unicycle in a direction during use. The single wheel may therefore be formed from one or more tyres and/or hubs that are coupled together (via a differential, for example). For example, an embodiment may comprise a single hubless wheel having a single hubless rim with a plurality of separate tyres fitted thereon. Alternatively, an embodiment may comprise a single hubless wheel formed from a plurality of hubless rims (each having a respective tyre fitted thereon), wherein the plurality of hubless rims are coupled together via a differential bearing arrangement.

Embodiments may provide a self-balancing powered unicycle that can alter its operation depending on a detected intended usage of the unicycle. For example, the drive arrangement and/or balance control system may be automatically enabled or disabled to facilitate rapid and simple operation of the unicycle. Detection of an intended usage may be based on a user's manipulation of the overall device, therefore removing the need for a user to operate button, switches or the like. A 'button-less' self-balancing powered unicycle device may therefore be provided which has the appearance of being 'smart' or 'intelligent' because it can deduce a user's intended use of the device from their actions which manipulate the overall unicycle device.

BRIEF DESCRIPTION OF THE DRAWINGS

An example of the invention will now be described with reference to the accompanying diagrams, in which:

FIGS. 11A & 11B are side and front elevations, respectively, of the of an embodiment of a powered unicycle device, wherein the casing is moving between a closed and open configuration;

DETAILED DESCRIPTION

Figure 1:
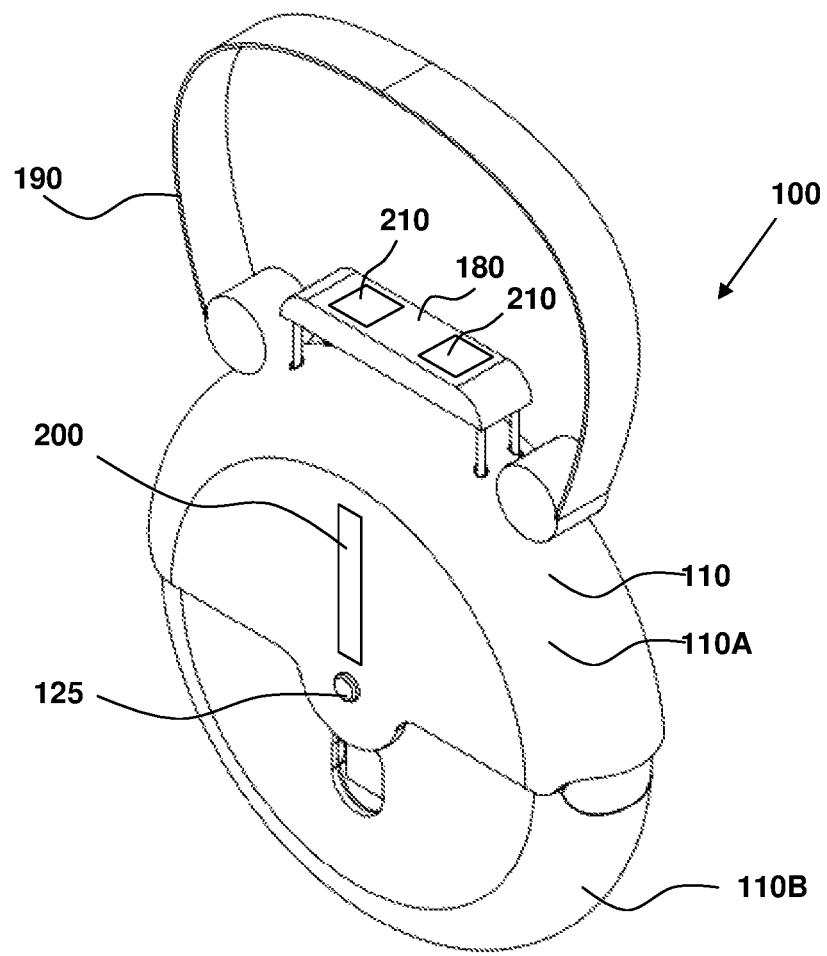
FIG. 1 is an isometric view of an embodiment of a powered unicycle device in a closed configuration.
Figure 2:
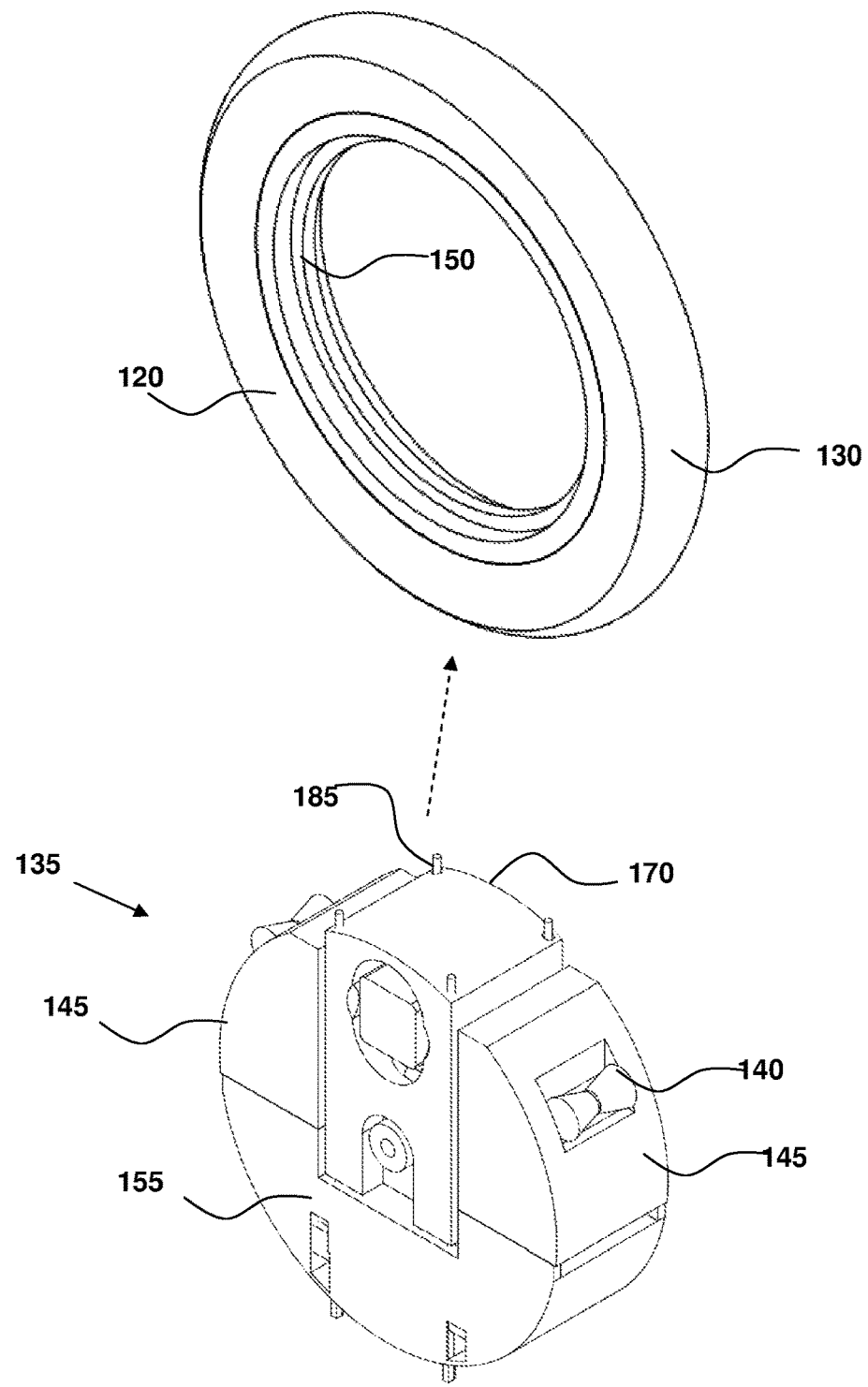
FIG. 2 is an exploded diagram of components internal to the casing of FIG. 1.

FIGS. 1-5 show one embodiment of a powered unicycle device 100. FIG. 1 shows the powered unicycle device 100 with a casing 110 in a closed configuration so that it encases a single wheel 120. Here, the casing 110 is formed from a first, upper portion 110A that covers the top (uppermost) half of the wheel 120, and a second, lower portion 110B that covers the bottom (lowermost) half of the wheel 120. FIG. 2 illustrates an exploded view of components internal to the casing 110, namely a wheel 120 and drive arrangement 135.

Figures 3A, 3B:
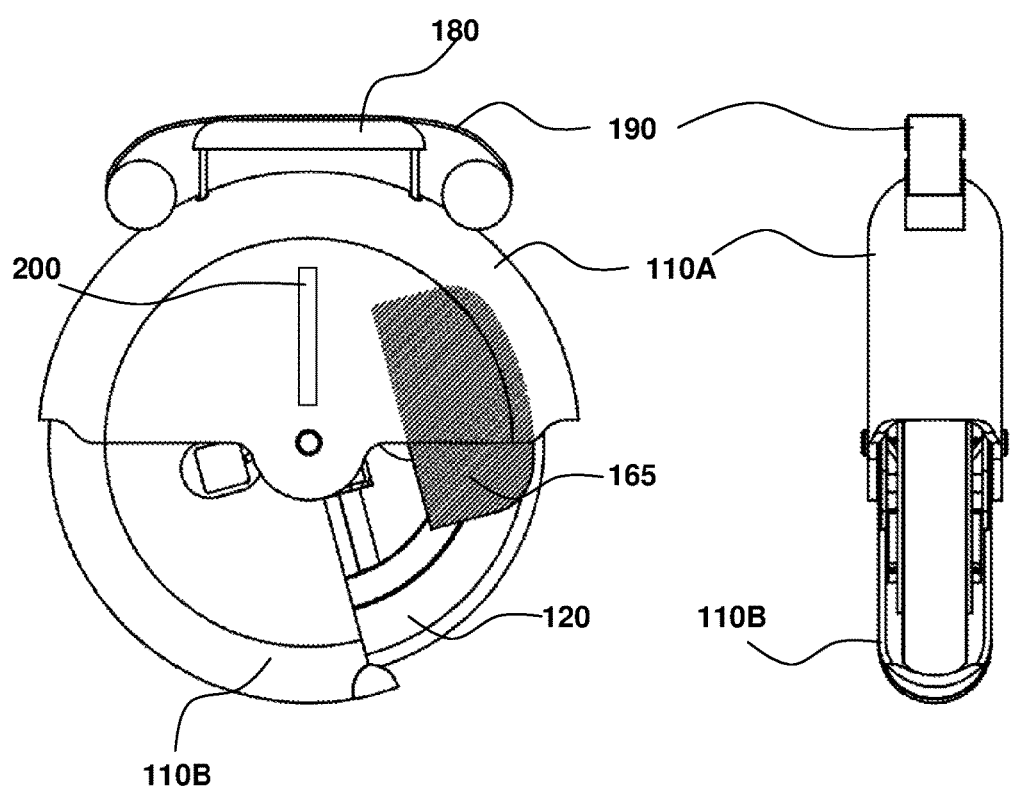
FIGS. 3A & 3B are side and front elevations, respectively, of the embodiment of FIG. 1, wherein the casing is moving between a closed and open configuration.
Figures 4A, 4B:
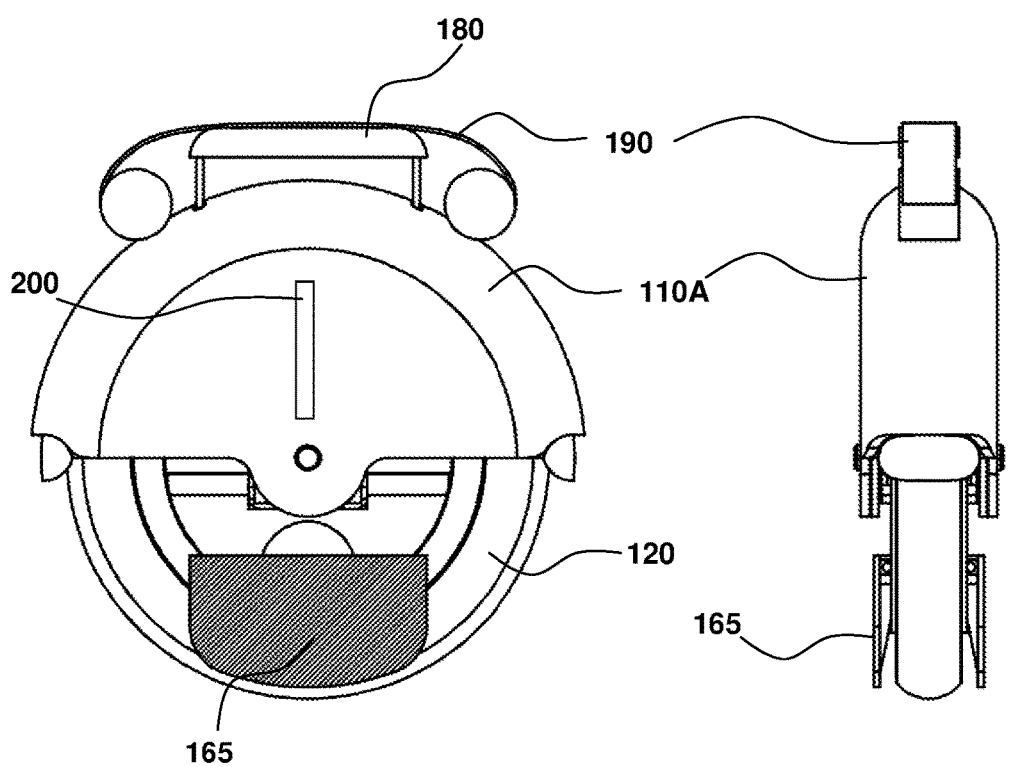
FIGS. 4A & 4B are side and front elevations, respectively, of the embodiment of FIG. 1, wherein the casing is in an open configuration and the foot platforms are in a stowed configuration.

Referring back to FIG. 1, the wheel 120 spins about a central axis 125. The first, upper portion 110A of the casing is retained in a fixed position relative to the central axis 125, whereas the second, lower portion 1106 of the casing is adapted to rotate about the central axis 125. Rotation of the second lower portion 1106 about the central axis 125 moves the casing between closed and open configurations (as illustrated by FIGS. 3-4). In the closed configuration (shown in FIG. 1), the casing 110 encloses the wheel 120 so that the outer rim 130 of the wheel 120 is not exposed. In the open configuration (shown in FIG. 5), the outer rim 130 of the wheel 120 is exposed so that it can contact a ground surface.

Referring now to FIG. 2, rotation of the single wheel 120 is driven by a drive arrangement 135 according to an embodiment. The drive arrangement 135 includes guide wheels 140 attached to an outwardly facing side of respective batteries 145. In this embodiment, there are two pairs of angled guide wheels 140, wherein the two guide wheels in each pair share are tapered or conical such that they have a sloped surface which is not perpendicular to the radial plane of the single wheel 120. Put another way, the contact surface of each guide wheel is inclined with respect to the radial plane of the single wheel 120. The guide wheels 140 of each pair are also positioned spaced apart to provide a gap between the two guide wheels of a pair.

A rib 150 is provided around the inner rim of the wheel 120 and fits into the gap between the two guide wheels 140 in each pair. The guide wheels 140 are therefore adapted to contact with the inner rim of wheel 120 where they spin along with wheel 120 and hold wheel 120 in place by way of the rib 150. Of course, it will be appreciated that other arrangements, including those with only one guide wheel per battery 145, are possible.

The batteries 145 are mounted on a motor 155 which drives a pair of drive wheels 160 positioned at the lowermost point along the inner rim of the wheel 120. The batteries 145 supply power to motor 155 and, this embodiment, there are two batteries in order to create a balanced distribution of volume and weight. However, it is not necessary to employ two batteries 145. Also, alternative energy storage arrangements may be used, such as a flywheel, capacitors, and other known power storage devices, for example.

The drive arrangement 135 is adapted to be fitted inside the wheel. In other words, the drive arrangement is sized and shaped so that it can be positioned in the void define by the inner rim of the wheel 120. Further, the drive arrangement 135 is movable between a locked configuration and an unlocked configuration.

In the locked configuration, when fitted inside the wheel 120, the drive arrangement 135 engages with the rim of the wheel 120 to prevent its removal from the wheel. Here, in the embodiment shown, the guide wheels 140 contact the inner rim of wheel 120 and hold wheel 120 in place by way of the rib 150 when the drive arrangement is in the locked configuration.

In the unlocked configuration, when fitted inside the wheel 120, the drive arrangement 135 disengages with the rim of the wheel 120 to permit its removal from the wheel. Here, in the embodiment shown, the drive arrangement contracts in size when moved from the locked configuration to the unlocked configuration so that the guide wheels 140 no longer contact the inner rim of wheel 120 and no longer hold the wheel 120 in place by way of the rib 150. Such reduced size (e.g. diameter) of the drive arrangement 135 when in the unlocked configuration thus enables the drive arrangement 135 to be removed from the wheel 120.

It will therefore be understood that the drive arrangement 135 of the illustrated embodiment can be quickly and easily connected or removed to/from the wheel 120 for repair or replacement, for example. Arranging the drive arrangement 135 in the unlocked configuration permits its removal or fitting from/to the wheel 120 (because, for example, its dimensions when in the unlocked configuration permit its fitting inside the wheel). When fitted inside the wheel 120, the drive arrangement can be arranged in the locked configuration so that it engages with the rim of the wheel 120 to prevent its removal (because, for example, its dimensions when in the locked configuration prevent the drive arrangement from being removed from the wheel).

When the drive arrangement 135 is fitted inside the wheel and in the locked configuration, a pair of drive wheels (not visible in FIG. 2) is adapted to contact the inner rim of the wheel 120. Here, the pair of drive wheels comprises first and second rollers that are inclined with respect to the radial plane of the wheel. By way of contact with the inner rim of the wheel 120, the drive wheels transmit torque from the motor 155 to the wheel 120. It will be understood that this drive system operates by friction and it may be preferable to avoid slippage between the drive wheels and the inner rim of wheel 120. Positioning the drive wheels at the lowermost point enables the weight of a user to provide a force which presses the drive wheels against the inner rim of the wheel 120, thereby helping to reduce or avoid slippage.

Figure 5:
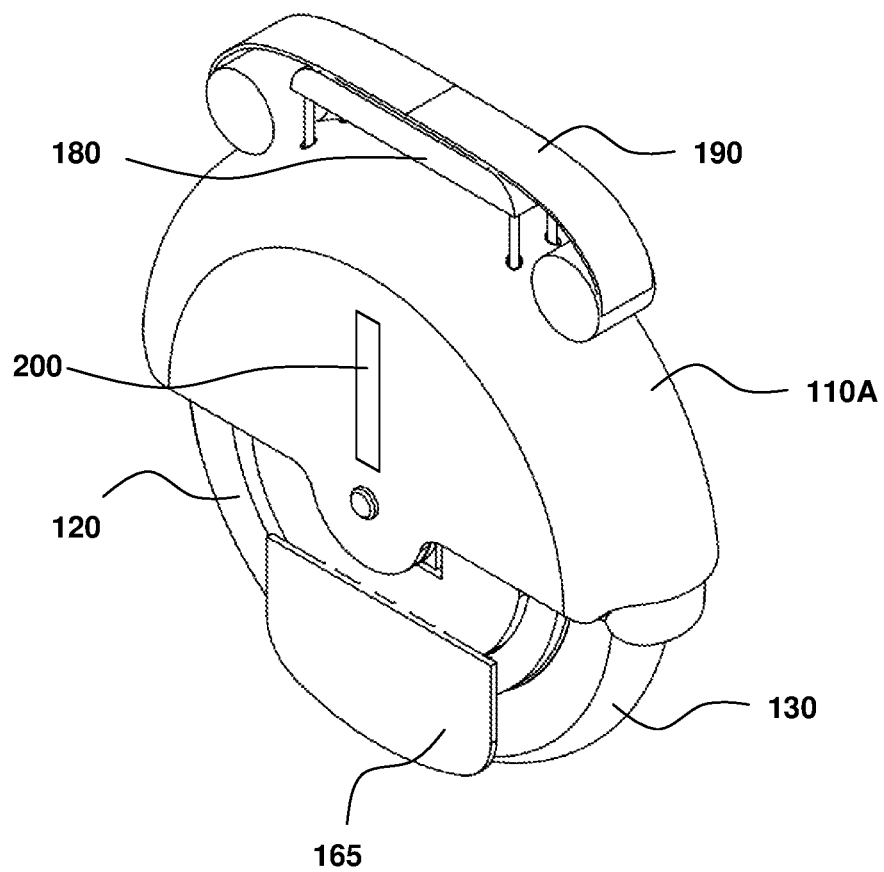
FIG. 5 is an isometric view of the embodiment of FIG. 1, wherein the casing is in an open configuration and the foot platforms are in a stowed configuration.
Figures 6A, 6B:
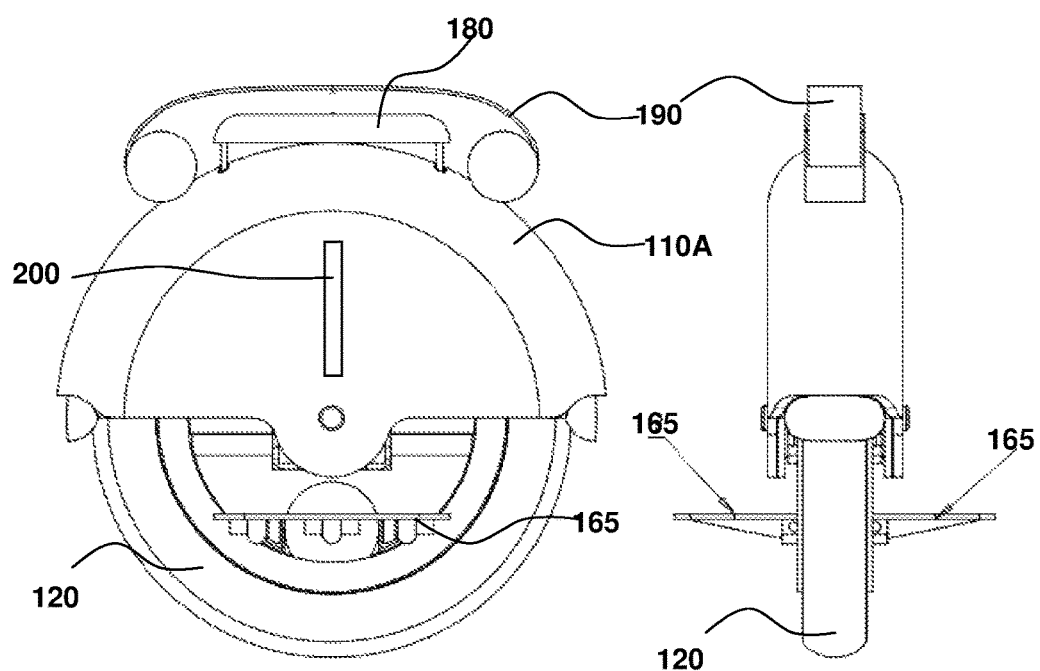
FIGS. 6A & 6B are side and front elevations, respectively, of the embodiment of FIG. 1, wherein the casing is in an open configuration and the foot platforms are in an active configuration.
Figure 7:
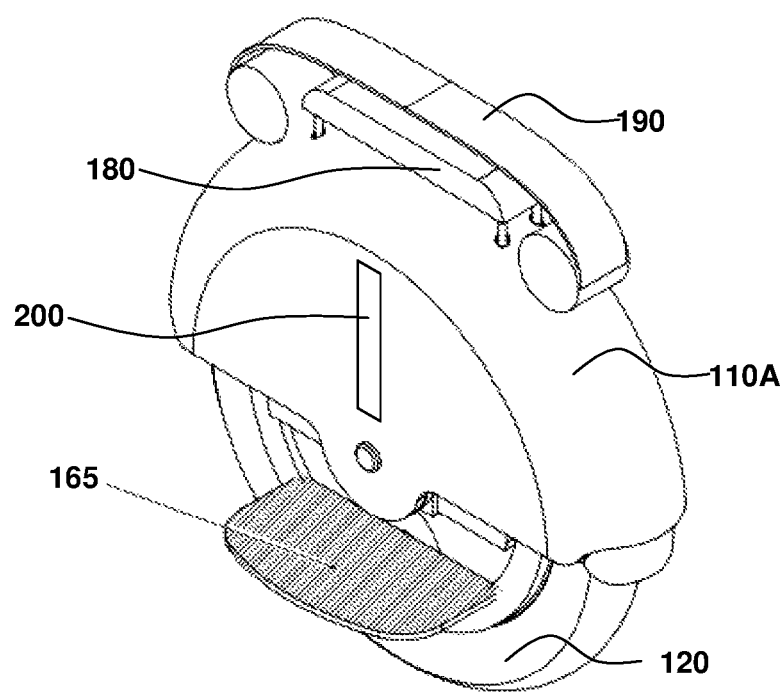
FIG. 7 is an isometric view of the embodiment of FIG. 1, wherein the casing is in an open configuration and the foot platforms are in an active configuration.

Referring to FIGS. 5-7, two foot platforms 165 are coupled to the second, lower portion 110B of the casing 110, with one on each side of wheel 120. In the open configuration, the foot platforms 165 are movable between a stowed configuration, wherein the foot platforms are substantially parallel with the plane of the wheel (as shown in FIG. 5), and an active configuration, wherein the foot platforms are substantially perpendicular to the plane of the wheel (as shown in FIGS. 6-7) so as to support a user's weight. Thus, in this embodiment, the foot platforms 165 are movable between: (i) a stowed configuration wherein they are flat against the side of the wheel and can be rotated (with the second, lower portion 110B of the casing) about the central axis 125 so as to be positioned inside (and covered by) the first, upper portion 110A of the casing; and (ii) an active configuration, wherein they project outwardly from the side of the wheel to provide a support surface for the feet of a user. Accordingly, the foot platforms 165 are upwardly foldable into a stowed configuration that narrows the profile of the unicycle 100 to aid in storage and carrying. In use, the foot platforms are moved to the active configuration, and the user stands with one foot on each platform 165.

The drive arrangement 135 includes a gyroscope or accelerometer system 170 which senses forward and backward tilt of the device in relation to the ground surface and regulates the motor 155 accordingly to keep the device upright. In this way, the user is provided a way of controlling the acceleration and deceleration of the unicycle by varying the pressure applied to various areas of the foot platforms 165. It also enables the unicycle to self-regulate its balance in the fore-and-aft plane.

When not in use, the foot platforms 165 are moved to the stowed configuration and then rotated (with the second, lower portion 110b of the casing) about the central axis 125 so as to move the casing to the closed configuration. Thus, in the closed configuration, the foot platforms 165 are stored inside the casing (covered by the first, upper portion 110A of the casing).

The embodiment of FIGS. 1-7 also comprises a lifting handle 180 coupled to the drive arrangement 135 via a plurality of rods 185. The lifting handle 180 is positioned at the top of the casing 110, above the wheel 120, and may be used to hold the unicycle 100 above the ground, for example to enable a user to lift, carry, convey or place the unicycle 100.

A retractable carrying strap 190 is also provided and attached to the top of the casing 100. The carrying strap 190 may be used to carry the unicycle 100, for example over the shoulder of user. A hook may be provided on the bottom of the case to create rucksack-like belts from the carrying strap 190.

The embodiment of FIGS. 1-7 also comprises an entity presence detection system 200 adapted to detect the presence of a user. More specifically, in this embodiment, the entity presence detection system 200 comprise a proximity sensor 200 situated on each side of the first, upper portion 110A of the casing above the central axis 125. Each proximity sensor 200 is adapted to detect the existence of a user's leg in close proximity with the proximity sensor 200. In order to do this, the proximity sensors 200 may, for example, employ infrared reflection, ultrasonic sensing, and/or and light detection principles to detect if/when a user's leg is positioned in close proximity with the proximity sensor (e.g. contacting the first, upper portion 110A of the casing).

The proximity sensors 200 provide a signal indicating whether or not a user's presence it detected. This signal is provided to a control system (not shown) which is to control operation of the powered unicycle, by controlling the drive arrangement 135 for example. Based on an indication of detected user presence provided by the signal(s) from the proximity sensors 200, the control system controls operation of the powered unicycle.

Here, the entity presence detection system 200 is also adapted to trigger an activating system which moves the casing between the closed and open configurations. More specifically, the entity presence detection system 200 further comprises proximity sensors 210 incorporated into the handle 180 which are adapted to detect when a user's hand contacts the upper surface of the handle (e.g. when a user grips the handle 180). When one of the proximity sensors 210 incorporated into the handle 180 detects a user's hand contacting the upper surface of the handle 180, it provides an activation signal which triggers the activating system which, in turn, causes the second, lower portion 110B of the casing to rotate about the central axis to move from the closed configuration to the open configuration. This process of rotating the second, lower portion 110B of the casing from the closed configuration to the open configuration is depicted by FIGS. 3-4.

It will therefore be understood that, in this embodiment, the proximity sensors 210 in the lifting handle 180 may be used to initiate the activating system and move the casing from the closed configuration to the open configuration. Thus, when a user holds the unicycle 100 by the handle, the proximity sensors 210 triggers the activating system. In response to this trigger, the activating system moves the casing to the open configuration (depicted in FIGS. 4 & 5) so that the lowermost portion of the wheel is exposed and can be brought into contact with a ground surface. In other words, when lifted by the lifting handle 180, the unicycle may be arranged in an open configuration ready for deployment (e.g. placement on a ground surface).

Further, when placed on the ground and the balance control system is activated, release of the handle causes the foot platforms to move from the stowed configuration (shown in FIGS. 4 & 5) to the active configuration (shown in FIGS. 6 & 7).

When the user no longer desires to use the unicycle, the user grips the lifting handle to lift the unicycle from the ground. This results in the proximity sensors 210 triggering the activating system once again which then causes the foot platforms to move from the active configuration (shown in FIGS. 6 & 7) to the stowed configuration (shown in FIGS. 4 & 5), and then subsequently causes the activating system to move the casing from the open configuration (depicted in FIGS. 4 & 5) to the closed configuration (depicted in FIG. 1).

Figure 8:
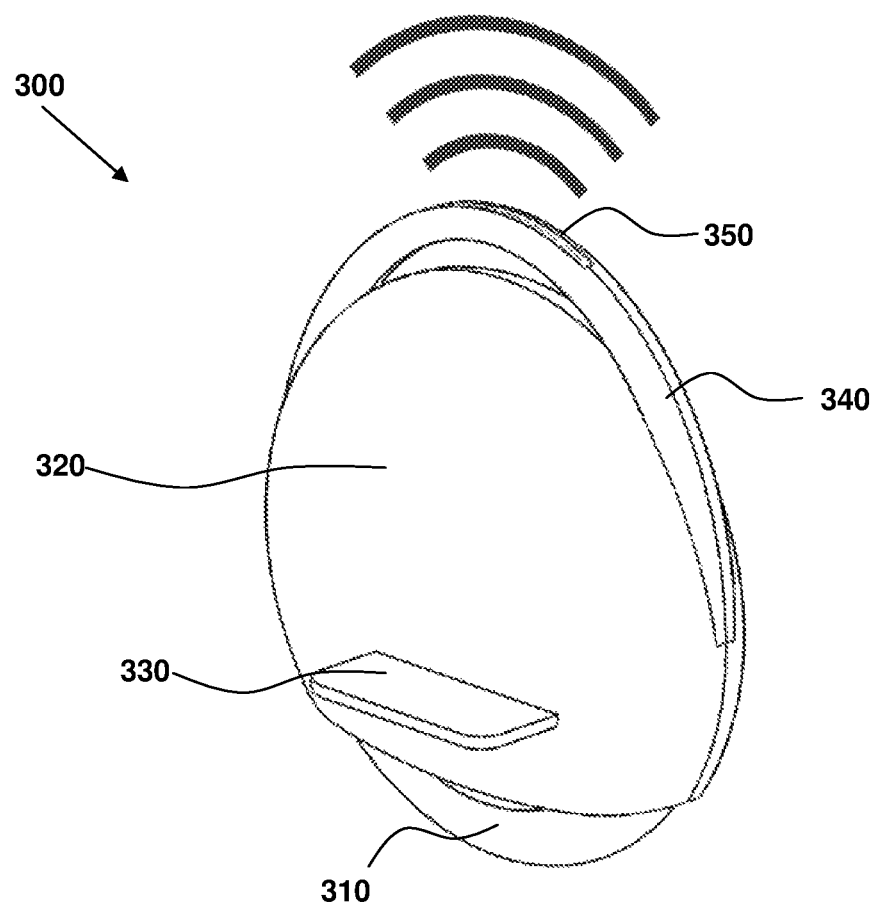
FIG. 8 is simplified isometric view of another embodiment of a self-balancing powered unicycle device.

Turning now to FIG. 8, there is depicted a self-balancing powered unicycle 300 according to an embodiment of the invention.

The self-balancing powered unicycle 300 comprises: a single wheel 310; a drive arrangement (not visible) adapted to drive the wheel 310; a balance control system (not visible) adapted to maintain fore-aft balance of the unicycle 310; a casing 320 adapted to cover a portion of the outer rim of the wheel 310; a foot platform 330 projecting horizontally outwardly from each side of the casing 320 for supporting a user of the unicycle; a handle 340 for lifting the unicycle 300; a user presence detection system 350 adapted to detect the presence of a user on or at the handle 340; and a control system (not visible) adapted to control operation of the powered unicycle based on an signal from the user presence detection system 350.

Here, the user presence detection system comprises a proximity sensor 350 integrated into the upwardly facing surface of the 340. The proximity sensor 350 comprises a light sensitive detector that is adapted to detect the existence of an entity in close proximity with the proximity sensor 350 based on the amount (e.g. intensity or luminosity) of light incident on the light sensitive detector.

When a user holds the handle 340 (with at least one of their hands), the light sensitive detector detects the associated drop/decrease in the amount of light incident on the light sensitive detector (caused by the user's hand covering a portion of the light sensitive detector). As a result, the proximity sensor 350, provide an indication that the user is present at the handle 340 of the unicycle. Based on this indication, the control system is adapted to control operation of the powered unicycle. More specifically, in this example, the control system disables the drive arrangement so that the rotation of the wheel is prevented. Such disabling of the drive arrangement is arranged on the premise/assumption that when the user is holding the handle 340, the user is either lifting/carrying the unicycle 300 or wishes to stop the unicycle 300.

The embodiment of FIG. 8 may therefore enable rapid disablement of the unicycle 300 by being adapted to automatically de-activate a drive arrangement when a user dismounts from, or carries, the unicycle 300. Such automatic activation/de-activation may provide power savings, and may also improve device safety by altering operation (e.g. stopping the motor from turning the wheel) when a user picks up the unicycle 300.

Figure 9:
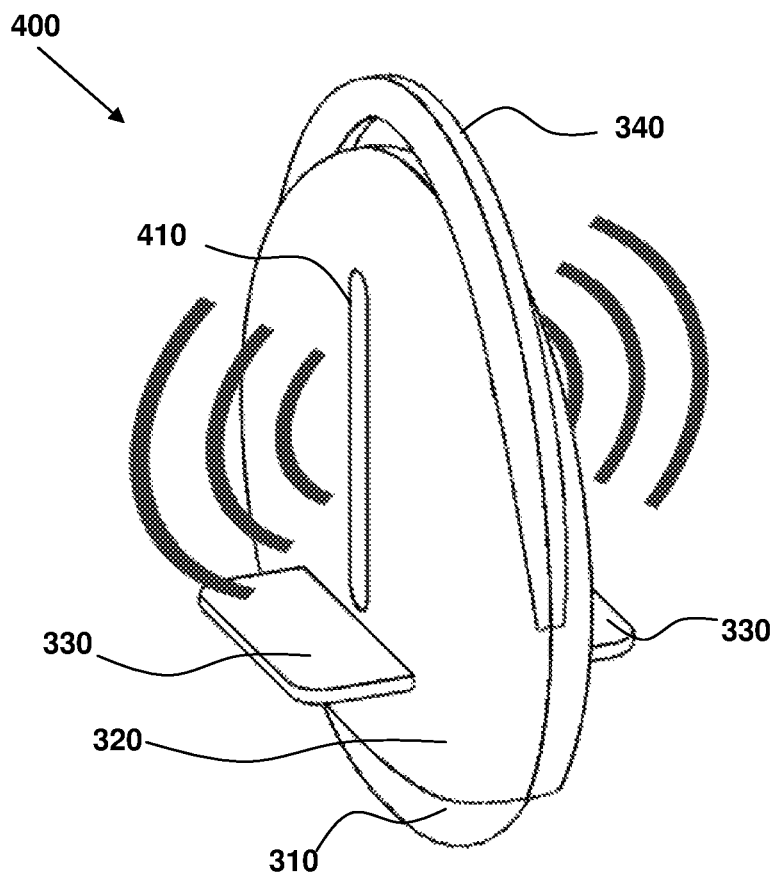
FIG. 9 is simplified isometric view of a modified version of the embodiment of FIG. 8.

Referring to FIG. 9, there is depicted a modification to the embodiment of FIG. 8. More specifically, the self-balancing powered unicycle 400 of FIG. 9 is similar to that of FIG. 8, except for the difference that the handle 340 does not comprise a proximity sensor integrated therein. Instead, the user presence detection system comprises a proximity sensor 410 integrated into each side of the casing 320. More specifically, each proximity sensor 410 is arranged in a vertically-extending direction above a respective foot platform 330 and employs infrared reflection to detect the existence of an entity in close proximity with it. It will therefore be understood, that each proximity sensor 410 is adapted to detect the presence of a user's lower leg (e.g. foot, ankle and/or calf) next to, adjacent, or contacting the proximity sensor.

When a user stands on the foot platforms 330 (e.g. with each foot supported by a respective foot platform 330), the proximity sensors 410 detect the associated increase in infrared light reflected back to the proximity sensors 410. As a result, the proximity sensors 410, provide an indication that the user is present on the foot platforms 330 of the unicycle 400. Based on this indication, the control system is adapted to control operation of the powered unicycle. More specifically, in this example, the control system enables the drive arrangement so that the rotation of the wheel is permitted. Such enabling of the drive arrangement is arranged on the premise/assumption that when the user is present on the foot platforms 330, the user wishes to operate the unicycle 400.

Conversely, when a user stands user alights or dismounts from the unicycle 400 (e.g. by intentionally stepping off the foot platform(s) 330 or by falling off), the proximity sensors 410 detect the associated decrease in reflected infrared light reflected. As a result, the proximity sensors 410, provide an indication that the user is not present on the foot platforms 330 of the unicycle 400. Based on this indication, the control system is adapted to disable the drive arrangement so that the rotation of the wheel is not permitted. Such disabling of the drive arrangement is arranged on the premise/assumption that when the user is not present on the foot platforms 330, the user has fallen or stepped away the unicycle 400 and wishes to stop the unicycle 400.

The embodiment of FIG. 9 may therefore enable rapid disablement of the unicycle 400 by being adapted to automatically de-activate a drive arrangement when a user dismounts or falls from the unicycle 400. Such automatic activation/de-activation may provide for improved device safety.

Figure 10:
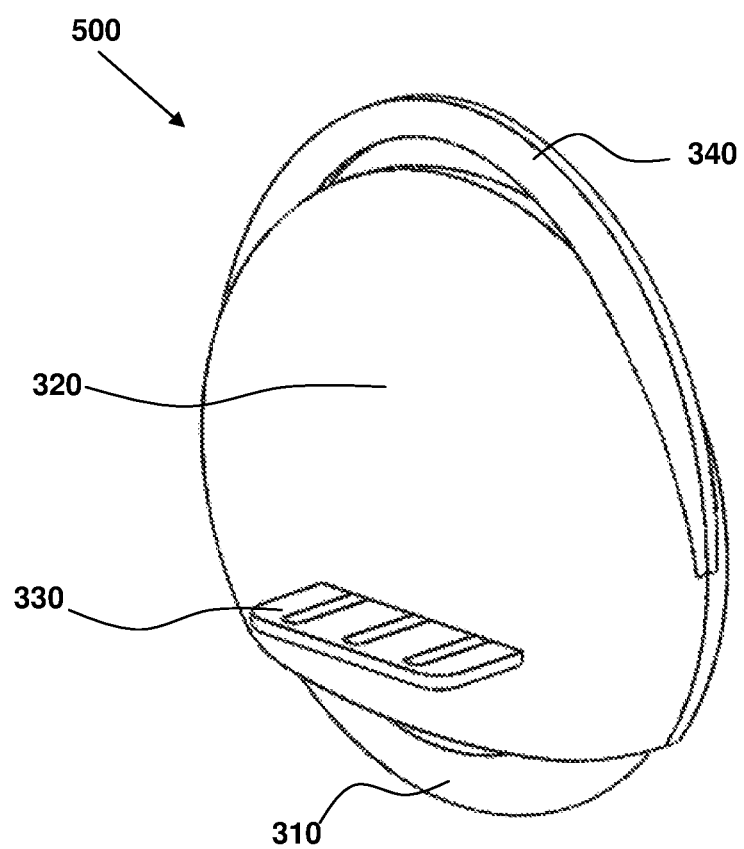
FIG. 10 is simplified isometric view of a modified version of the embodiment of FIG. 8.

Referring to FIG. 10, there is depicted a modified version of the embodiments of FIGS. 8 and 9. More specifically, the self-balancing powered unicycle 500 of FIG. 10 is similar to that of FIGS. 8 and 9, except for the difference that the entity presence detection system does not comprise a proximity sensor integrated either in the handle 340 or the casing 320. Instead, the entity presence detection system comprises a signal processing system housed within the casing 320. The signal processing system (such as a processing unit for example) is adapted to process signals from one or more parts of the unicycle 500 in accordance with an algorithm to determine if an entity is present on, at or near a part of the powered unicycle 500.

More specifically, in the embodiment of FIG. 10, the entity presence detection system comprises a processing unit (not visible) that is adapted to process signals from the drive arrangement and/or the balance control system in accordance with a predetermined algorithm. The algorithm is adapted to determine if the signals from the drive arrangement and/or the balance control system exhibit a predetermined characteristic indicating the presence or non-presence of an entity on, at or near a part of the powered unicycle.

By way of example, the signals from the drive arrangement and/or the balance control system comprise information relating to at least one of: accelerometer data; gyroscope data; motor torque; speed of wheel rotation; and a motor drive voltage. Using such information, the processing unit is adapted to determine the presence or non-presence of an entity on, at or near a part of, the unicycle 500, by determining if values and/or relationships between values are within a predetermined range for example.

It will be appreciated that variations on the user presence detection systems described above may employ other concepts for determining the presence of a user. For example, in another embodiment, the user presence detection system may comprise a load sensing system adapted to determine a loading applied to at least one part of the powered unicycle (such as a foot platform for example). Such a load sensing system may be adapted to determine at least one of: a deflection of the at least one foot platform; a tensile force applied to the at least one foot platform; and a compressive force applied to the at least one foot platform of the unicycle so as determine a loading applied to the at least one foot platform. If the loading is above a predetermined threshold, it may be determined that a user is supported (e.g. standing on) the at least one foot platform and therefore present on the unicycle for example.

In another example, the entity presence detection system may comprise a vibration sensor adapted to detect a frequency of vibration of at least one part of the powered unicycle. Such a user presence detection system may, for example, be adapted to determine the presence or non-presence of a user by determining if a detected frequency of vibration of at least one part of the powered unicycle is within a predetermined range.

In yet another example, the entity presence detection system may comprise a proximity sensor adapted to detect the proximity of the ground in relation to a part (such as the foot platform(s) or the base of the casing) of the unicycle. The determined proximity may be used to indicate if the unicycle has left the ground (i.e. is no longer in contact with the ground) due to being lifted or jumping for example. Such a determination may then be used to control the drive arrangement so as to enable, disable or adjust rotation of the wheel for example.

Embodiments may be provided separately from a self-balancing powered unicycle and therefore adapted to be fitted to (or integrated with) an existing self-balancing powered unicycle. In others, embodiments may be provided as a standalone entity presence detection system which can be retro-fitted to a conventional self-balancing powered unicycle. Such a system may also be adapted to be employed or installed in a self-balancing powered unicycle at time of manufacture.

Thus, there is provided a self-balancing powered unicycle comprising: a single wheel; a drive arrangement adapted to drive the wheel; a balance control system adapted to maintain fore-aft balance of the unicycle device; at least one foot platform for supporting a user of the unicycle device; an entity presence detection system adapted to detect the presence of an entity on, at or near a part of the powered unicycle and provide an indication of detected entity presence; and a control system adapted to control operation of the powered unicycle based on the indication of detected entity presence from the entity presence detection system.

There is proposed a self-balancing powered unicycle comprising an entity presence detection system that is arranged to detect the presence of an entity on, at or near the powered unicycle. Based on a detected presence or non-presence of an entity (such as a user for example), the operation of the unicycle may be controlled. In other words, the unicycle may be adapted to alter its operation depending on whether or not an entity is present on the unicycle. For example, operation of a drive arrangement of the unicycle may be prevented when no user is present on the unicycle. By way of further example, operation of a drive arrangement may be altered to provide an improved or desired response based on characteristics or properties a detected presence.

The entity presence detection system may, for example, provide an indication that a user is present on the unicycle and wishes to use the unicycle device. Embodiments may therefore allow for rapid deployment by being adapted to automatically activate a drive arrangement and/or the balance control system of the unicycle when a user stands on the unicycle. Similarly, embodiments may enable rapid disablement by being adapted to automatically de-activate a drive arrangement and/or the balance control system of the unicycle when a user dismounts from the unicycle. Such automatic activation/de-activation may provide power savings, and may also improve device safety by altering operation (e.g. stopping the motor from turning the wheel) when a user alights the unicycle (intentionally or accidentally).

An entity presence detection system of a proposed embodiment may provide an indication or signal which is used by a control system to alter operation of the unicycle upon occurrence of one or more predetermined conditions indicating an entity is present or not-present on the unicycle. Such embodiments may therefore enable quick and easy deployment from an off configuration (wherein the rotation of the wheel is disabled, for example) to an on configuration (wherein rotation of the wheel is enabled, for example). This deployment may require little or no input from the user, but instead may be automatically achieved when the user is in close proximity with, or contacts) one or more predetermined parts of the unicycle.

Embodiments may enable the powered unicycle to automatically disable if the user alights or dismounts from the unicycle (e.g. by intentionally stepping off the foot platform(s) or by falling off). The entity presence detection system may therefore facilitate multiple functions, including the provision of an automatic power saving mode, the provision of quick start-up/deployment, and the provision of an automatic-shutdown safety feature. The entity presence detection system may thus provide not only for improved user interaction, but also for improved safety and to protect the unicycle.

The entity presence detection system may comprise one or more proximity sensors adapted to detect the existence of an entity in close proximity with the proximity sensor. Further, at least one of the one or more proximity sensors may employ at least one of: infrared reflection; ultrasonic sensing; microwave sensing; pressure sensing; temperature sensing; and light detection to detect the existence of an entity in close proximity with the proximity sensor.

An embodiment may further comprise a handle for lifting the unicycle. Such a handle may be used to hold the unicycle above the ground, for example to enable a user to lift, carry, convey or place the unicycle. The handle may also comprise part of the entity presence detection system so that the handle (or a part thereof) may be used to provide an indication of detected user presence and thus control operation of the powered unicycle. For example, the handle may comprise a proximity sensor.

An embodiment may further comprise a casing adapted to cover at least a portion of the outer rim of the wheel, and the casing may comprise a proximity sensor.

According to another embodiment, the entity presence detection system may comprise a load sensing system adapted to determine a loading applied to at least one part of the powered unicycle. Further, the load sensing system may be adapted to determine at least one of: a deflection of the wheel axel; a compressive force applied to the wheel axel; a deflection of the at least one foot platform; a tensile force applied to the at least one foot platform; and a compressive force applied to the at least one foot platform, so as determine a loading applied to the at least one foot platform of the powered unicycle. In such embodiments, operation of the unicycle may be based on a value of the loading applied to one or more of its parts. For example, for a heavier user exerting a greater load on the unicycle, the drive arrangement may be adapted to provide extra power for rotating the wheel. Conversely, for a small/lightweight user exerting a lower load on the unicycle, the drive arrangement may be adapted provide reduced power so as to ensure the wheel rotates within a desired speed range (and not too quickly for example) and/or to conserve power/energy.

In some embodiments, the entity presence detection system may comprise a processing unit adapted to process signals in accordance with an algorithm to determine if an entity is present on, at or near a part of the powered unicycle. By way of example, such an algorithm may be adapted to determine if the signals from the drive arrangement and/or the balance control system exhibit a predetermined characteristic indicating the presence or non-presence of a user on the powered unicycle.

The signals from the drive arrangement and/or the balance control system may comprise information relating to at least one of: casing orientation; inclination or angle of a part of the unicycle; value of compressive force applied to at least part of a foot platform; accelerometer data; gyroscope data; motor torque; speed of wheel rotation; and a motor drive voltage.

Embodiments may process signals from the unicycle in accordance with one or more algorithm to identify discrepancies between user control input the unicycle's drive arrangement and/or balance control system, for example. In this way, it may be determined if a user is actively controlling the unicycle or the unicycle is not operating as expected (e.g. as may occur in a 'runaway' situation).

In yet another embodiment, the entity presence detection system may comprise a vibration sensor adapted to detect a frequency of vibration of at least one part of the powered unicycle. The entity presence detection system may be adapted to determine the presence or non-presence of a user based on if a detected frequency of vibration of at least one part of the powered unicycle is within a predetermined range.

Thus, there is proposed an entity presence detection system for a self-balancing powered unicycle, wherein the entity presence detection system is adapted to detect the presence of an entity on, at or near a part of the powered unicycle and provide an indication of detected entity presence.

Embodiments may comprise one or more proximity sensors adapted to detect the existence of an entity in close proximity with the proximity sensor.

Embodiments may be further adapted to be integrated into a handle of a self-balancing powered unicycle.

An embodiment may comprise a load sensing system adapted to determine a loading applied to at least one part of a self-balancing powered unicycle.

Some embodiments may comprise a processing unit adapted to process signals in accordance with an algorithm to determine if an entity is present on, at, or near a part of a self-balancing powered unicycle.

In an embodiment, the entity presence detection system may comprise a vibration sensor adapted to detect a frequency and/or amplitude of vibration of at least one part of a self-balancing powered unicycle.

Embodiments may provide a self-balancing powered unicycle that can alter its operation depending on the presence of an entity on, at or near a part of the unicycle. For example, the drive arrangement may be automatically enabled or disabled to facilitate rapid and simple operation of the unicycle.

Figures 12A, 12B:
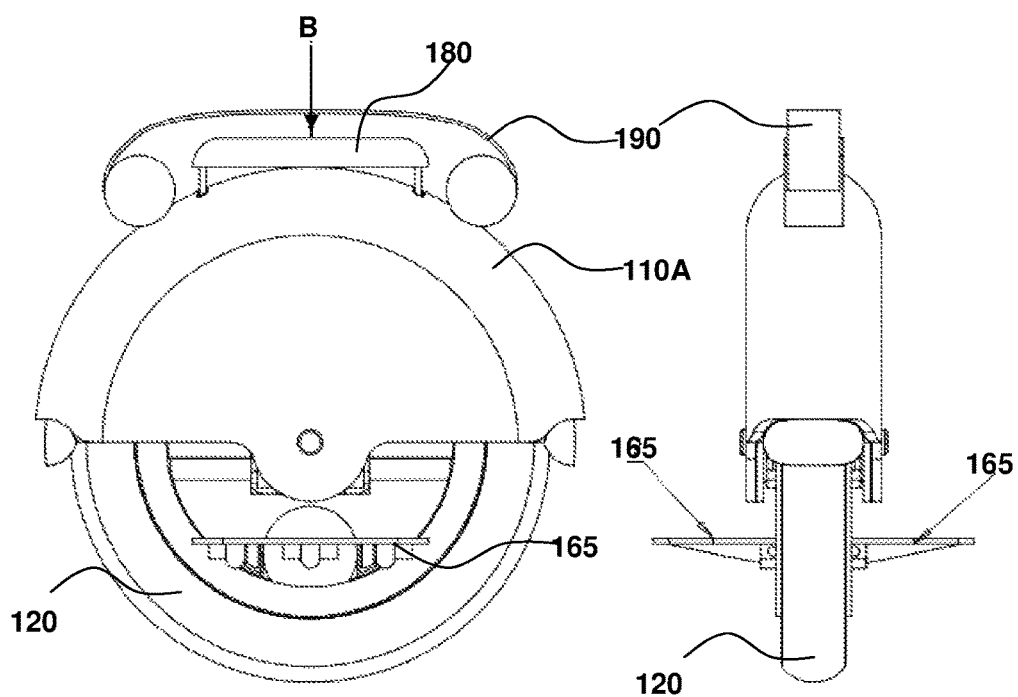
FIGS. 12A & 12B are side and front elevations, respectively, of the embodiment of FIG. 11, wherein the casing is in an open configuration and the foot platforms are in an active configuration.

Referring to FIGS. 11-12, there is depicted a modification to the embodiment of FIGS. 1-5. The powered unicycle device of FIGS. 11-12 is similar to that of FIG. 1-5 except that is does not include the entity presence detection system 200 adapted to detect the presence of a user. More specifically, the embodiment of FIGS. 11-12 does not comprise a proximity sensor 200 situated on each side of the first, upper portion 110A of the casing above the central axis 125. Instead, in the embodiment of FIGS. 11-12, the handle 180 is also adapted to trigger an activating system which moves the casing between the closed and open configurations. More specifically, movement of the handle relative to the casing 110 in an outward direction (away from the centre of the wheel 120) as depicted by an arrow labeled "A", triggers the activating system which in turn causes the second, lower portion 110B of the casing to rotate about the central axis to move from the closed configuration to the open configuration. This process of rotating the second, lower portion 110B of the casing from the closed configuration to the open configuration is depicted by FIG. 11.

It will therefore be understood that, in this embodiment, the lifting handle 180 may be used to initiate the activating system and move the casing from the closed configuration to the open configuration. Thus, when a user holds the unicycle 100 by the handle above the ground, the force of the unicycle pulling downwards under the influence of gravity causes upward movement of the lifting handle 180 relative to the casing 110 (as depicted by an arrow labeled "A") which triggers the activating system. In response to this trigger, the activating system moves the casing to the open configuration so that the lowermost portion of the wheel is exposed and can be brought into contact with a ground surface. In other words, when lifted by the lifting handle 180, the unicycle may be arranged in an open configuration ready for deployment (e.g. placement on a ground surface).

Further, when placed on the ground, the depression of the handle in a downward/inward direction (towards the centre of the wheel 120) as depicted by an arrow labeled "B" moves the rods 185 and cause the foot platforms to move from the stowed configuration to the active configuration (shown in FIG. 12). Here, downward movement of the rods causes the foot platforms 165 to rotate about an axis and the rods then hold the foot platforms 165 in place to support the feet of user.

When the user no longer desires to use the unicycle, the user pulls on the lifting handle to lift the unicycle from the ground. This results in upward movement of the lifting handle 180 and the associated rods 185 relative to the casing 110 (as depicted by an arrow labeled "A") which then causes the foot platforms to move from the active configuration (shown in FIG. 12) to the stowed configuration.

Thus, there is proposed a powered unicycle with self-balancing functionality that may be carried by a user when not in use, wherein a casing encloses the wheel and protects the wheel from coming into contact with external objects or the user for example. The wheel may therefore be protected from damage during transit. Also, when carrying the unicycle, the casing may protect a user or external object from coming into contact with dirt, fluid and/or dust present on the wheel.

Embodiments may allow for rapid deployment by being movable from a closed (e.g. stowed) configuration, wherein the wheel is encased by the casing, to an open (e.g. activated) configuration, wherein part of the outer rim of the wheel is exposed for contacting a ground support surface.

Embodiments may employ an activating system adapted to move the casing from the closed configuration to the open configuration. Such an activating system may be used to expose part of the outer rim of the wheel upon occurrence of one or more predetermined conditions indicating the user desires to use the unicycle. Such embodiments may therefore enable quick and easy deployment from a closed configuration (wherein the wheel is covered for protection) to an open configuration (wherein the wheel is readied for contact with the ground). This deployment may require little or no input from the user, but instead may be automatically achieved when the user and/or unicycle performs one or more predetermined actions or movements with the unicycle.

Embodiments may comprise one or more handles. Such a handle may be used to hold the unicycle above the ground, for example to enable a user to lift, carry, convey or place the unicycle. The handle may also form part of the activating system so that the handle (or a part thereof) may be used to initiate the activating system and move the casing from the closed configuration to the open configuration for example. In other embodiments, the handle may form part of a control system so that it may be used to control or initiate operation of the unicycle device.

The activating system and/or drive arrangement of the unicycle device may be adapted to be responsive to an indication that the user intends to use the unicycle device. Such an indication may be provided from: an accelerometer system which detects movement of the unicycle device; movement of a part of the activating system relative to the casing; a load detection system which detects loading on at least part of the unicycle device; or any combination thereof.

The at least one foot platform may be movable between a stowed position and an active position in response to the user lifting the unicycle device by the handle. For example, the handle may be designed such that when it is pulled or pushed from/to the casing it causes the activating system to move the unicycle from the closed configuration to the open configuration.

Figures 13A, 13B:
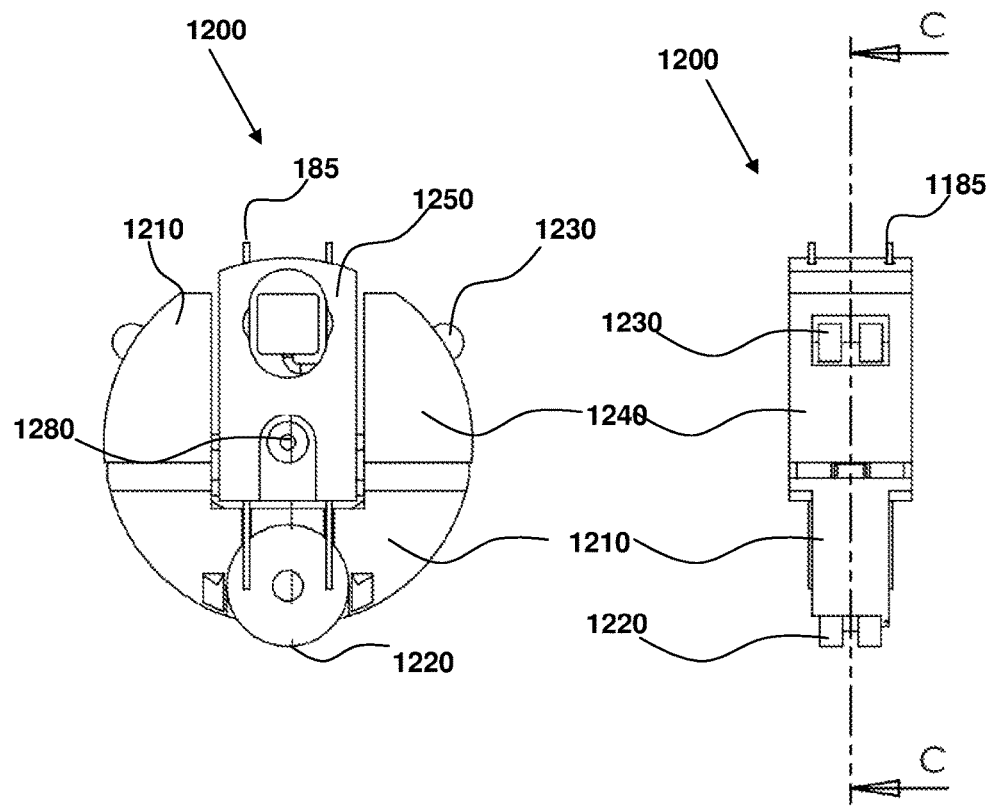
FIGS. 13A & 13B are side and front elevations, respectively, of a drive arrangement according to an embodiment.
Figure 14:
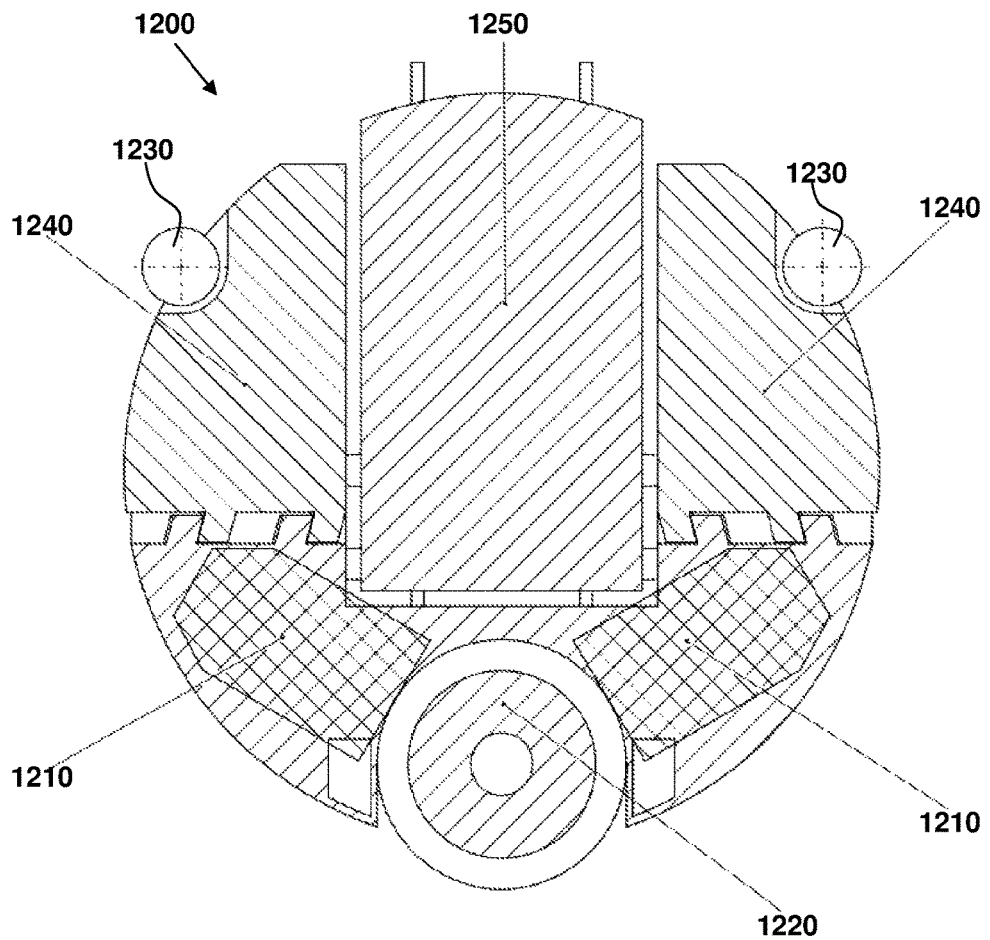
FIG. 14 is a cross sectional view of the drive arrangement of FIG. 13 taken along the line C-C.
Figure 15:
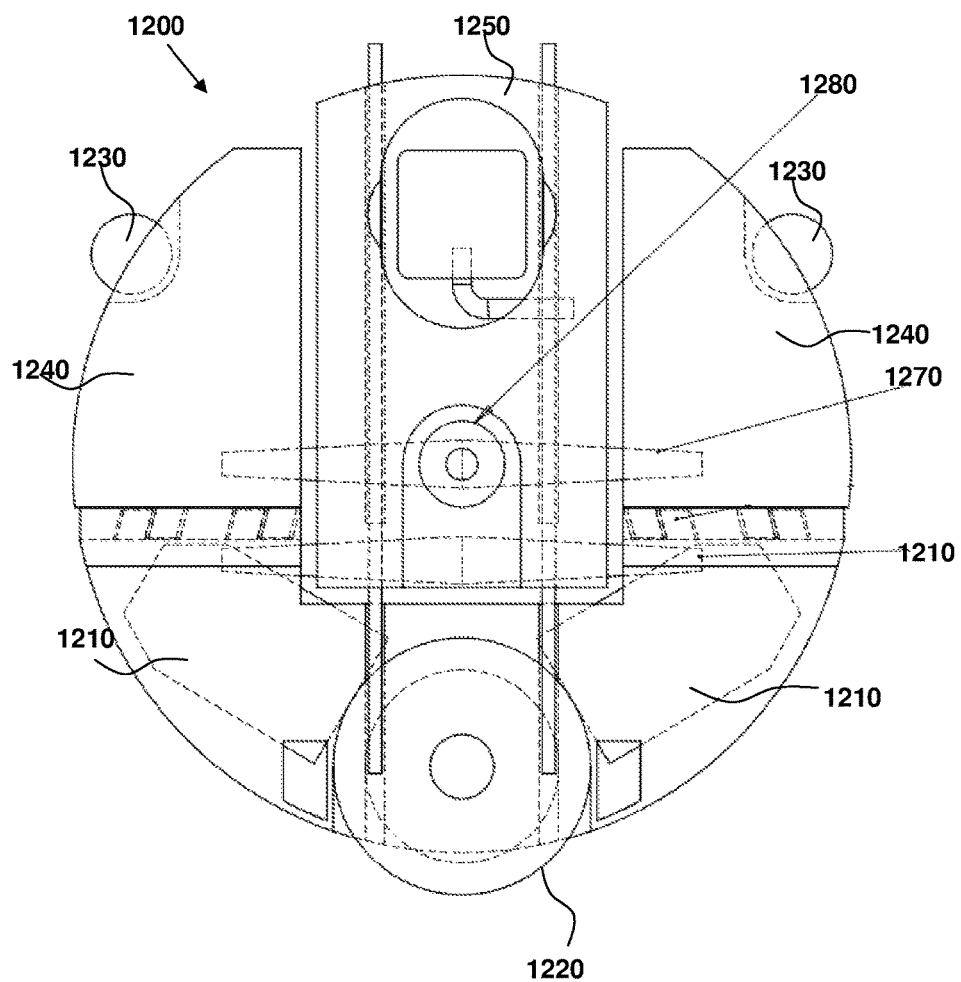
FIG. 15 is a side elevation of the drive arrangement of FIG. 13 wherein internal components are depicted by dashed lines.

Turning now to FIGS. 13-15, there is depicted a drive arrangement 1200 according to an embodiment of the invention. Such a drive arrangement 1200 is adapted to fit inside the wheel of a hubless unicycle so that it may be used to drive (e.g. rotate) the wheel.

The drive arrangement 1200 is adapted to be movable between a locked (or expanded) configuration, in which when fitted inside a hubless wheel the drive arrangement engages with the rim of the of the wheel to prevent its removal from the wheel, and an unlocked (or contracted) configuration, in which when fitted inside the hubless wheel the drive arrangement 1200 disengages with the rim of the wheel to permit its removal from the wheel. The drive arrangement 1200 may therefore be quickly and easily connected to (or removed from) the hubless wheel for repair or replacement.

The drive arrangement 1200 comprises a motor 1210 adapted to drive a hubless wheel by applying a force to the inner rim of the hubless wheel. Here, the drive arrangement 1200 comprises a drive wheel 1220 which is driven by the motor 1210 and adapted to contact the inner rim of the wheel (when the drive arrangement is fitted inside the wheel and in a locked configuration).

The drive arrangement 1200 also comprises guide wheels 1230 attached to an outwardly facing side of respective batteries 1240. Here, there are two pairs of guide wheels 1230, wherein the two guide wheels in each pair share the same axis of rotation (e.g. by sharing the same axle) and are positioned spaced apart to provide a gap between the two guide wheels.

When the drive arrangement is fitted inside the wheel and in a locked configuration, a rib provided around the inner rim of the wheel fits into the gap between the two guide wheels 1140 in each pair. The guide wheels 1140 are therefore adapted to contact with the inner rim of wheel where they spin along with wheel and prevent its removal in the locked configuration.

The batteries 1240 are mounted on the motor 1210. The batteries 1240 supply power to motor 1210. Alternative energy storage arrangements may of course be used, such as a flywheel, capacitors, and other known power storage devices, for example.

Also mounted on the motor 1210, and provided in-between the batteries 1240 is a balance control system 1250. The balance control system 1250 is adapted to maintain fore-aft balance of the unicycle device by controlling the motor.

Within the balance control system 1250, there is provided a locking system which is adapted to move the drive arrangement 1200 from the unlocked configuration to the locked configuration when activated. Here, the locking system comprises a rotatably mounted locking bar 1270 (visible in FIG. 15) that can be rotated (using an exposed portion 1280) through an angle of ninety degrees (90°) between a locked and unlocked position. In the locked position (depicted in FIG. 15), the locking bar 1270 extends into the batteries 1240 to exert an outwardly extending pressing force on the batteries which tends to move the batteries in an outward direction (i.e. a direction extending radially outward from the center of the drive arrangement 1200). This pushes the batteries outwardly so as to increase the diametrical extent of the drive arrangement 1200. In other words, moving (e.g. rotating) the locking bar 1270 to the locked position expands the size of the drive arrangement 1200 by moving the batteries outwards (from the centre of the drive arrangement 1200). Conversely, when the locking bar 1270 is moved to the unlocked position, the pressing force is removed from the batteries 1240 and they move in an inward direction (i.e. a direction extending radially inward towards the center of the drive arrangement 1200), due to a biasing force from a spring for example. This moves the batteries inwardly so as to decrease the diametrical extent of the drive arrangement 1200. Put another way, moving (e.g. rotating) the locking bar 1270 to the unlocked position contacts the size of the drive arrangement 1200 by moving the batteries inwards (towards the centre of the drive arrangement 1200).

The locking bar 1270 of this embodiment is adapted to be turned manually by a user. However, in alternative embodiments, the locking bar 1270 may be turned using a motor arrangement which is activated in response to a signal provided by the user for example. It will therefore be appreciated that the locking system may comprise an electrical or mechanical locking arrangement (or a combination thereof) which moves the drive arrangement 1200 between the locked and unlocked configuration.

Here, the locking bar 1270 is formed from an electrically conductive material (such as metal) so that it forms an electrical connection between the batteries 1240 and the balance control system 1250 and the motor 1210 when in the locked position. Thus, when in the unlocked position, the balance control system 1250, the motor 1210 and the batteries 1240 may be electrically isolated from each other, thereby preventing operation of the drive arrangement 1200. This may therefore provide a safety feature which prevents the motor 1210 or control system 1250 from operating, for example, when the drive arrangement 1200 is place into the unlocked configuration (for removal, replacement or repair, for example).

Embodiments may therefore provide a self-balancing powered unicycle that is modular in nature. The drive arrangement may be easily engaged and disengaged to/from the wheel to facilitate rapid and simple repair or replacement.

For example, the locking system may comprise a mechanical linkage, such as a reverse motion linkage, a parallel motion linkage, a crank and slider linkage, a bell crank linkage, or any combination thereof, for example. These mechanical linkages are well known in the art, and any such suitable mechanical linkage may be used to translate movement of a trigger, switch or lever to movement of a locking element so as to move the drive arrangement between the locked and unlocked configuration.

It will be appreciated that a variation on the hubless drive arrangement described above is one based on gear transmission instead of friction. The drive wheel may be replaced by a gear, and accordingly the inner rim of the wheel may have alternating protruding and indented segments (i.e. "teeth").

Although an embodiment has been described which uses a pivoted rod which moves the drive arrangement between a locked and unlocked configuration, other concepts may be used to alter the configuration of the drive arrangement. For example, an electronic locking system may be used which is responsive to one or more signals indicating that the user wishes to repair, inspect, replace, or simply remove the drive arrangement from the wheel. Such signals may be provided from a user input interface (such as a button, switch or a touchscreen for example) and/or a movement detection system (employing accelerometers for example). Alternatively, a mechanical arrangement may be used which moves the drive arrangement between the locked and unlocked configurations when a mechanical trigger, lock or release is moved. A combination of both mechanical and electronic systems may also be employed for moving the drive arrangement between the locked and unlocked configurations.

According to an embodiment, there is provided a drive arrangement for a self-balancing powered unicycle having a single hubless wheel, the drive arrangement comprising: a motor adapted to drive the wheel by applying a force to the rim of the wheel, wherein the drive arrangement is adapted to be fitted inside the wheel, and wherein the drive arrangement is adapted to be movable between a locked configuration, in which when fitted inside the wheel the drive arrangement engages with the rim of the of the wheel to prevent its removal from the wheel, and an unlocked configuration, in which when fitted inside the wheel the drive arrangement disengages with the rim of the wheel to permit its removal from the wheel.

There is proposed a drive arrangement for a self-balancing powered unicycle that can be quickly and easily connected or removed to/from the unicycle wheel for repair or replacement, for example. Also, by being fitted inside the wheel, embodiments may help to reduce the overall size or profile of the unicycle, thereby improving its portability.

Embodiments may allow for easy maintenance by being movable from a locked configuration, wherein the drive arrangement is engaged with the wheel to enable driving of the wheel, to an unlocked configuration, wherein the drive arrangement disengages from the wheel so that it may be removed from the wheel (for servicing, repair, fault diagnosis or replacement, for example).

Embodiments may further comprise a balance control system adapted to maintain fore-aft balance of the unicycle device by controlling the motor.

In embodiments, the drive arrangement may further comprise a locking system to move the drive arrangement from the unlocked configuration to the locked configuration when activated. Such a locking system may comprise a mechanical linkage, such as a reverse motion linkage, a parallel motion linkage, a crank and slider linkage, a bell crank linkage, or any combination thereof, for example. Accordingly, in embodiments, a locking system may be provided which disengages the drive arrangement from the wheel upon occurrence of one or more predetermined conditions indicating the user desires to remove the drive arrangement from the wheel. Such an indication may be provided, for example, by movement of the overall unicycle device in accordance with a predetermined pattern of movement. Embodiments may therefore enable quick and easy removal of the drive with little or no input from the user.

Embodiments may further comprise an energy storage device, such as one or more battery cells or capacitors for example. Further, such embodiments may comprise a locking system which is adapted to form at least part of an electrical connection between the electrical energy storage and the motor.

The drive arrangement may comprise a drive wheel adapted to be driven by the motor and to contact the rim of the wheel.

An embodiment may therefore provide a self-balancing powered unicycle comprising: a single hubless wheel; and a drive arrangement according to an embodiment.

Embodiments may therefore provide a self-balancing powered unicycle that is modular in nature. The drive arrangement may be easily engaged and disengaged to/from the wheel to facilitate rapid and simple repair or replacement.

While specific embodiments have been described herein for purposes of illustration, various modifications will be apparent to a person skilled in the art and may be made without departing from the scope of the invention.

For example, although embodiments have been described as employing single concepts or components for detecting an indication of intended usage from a user, it should be understood that embodiment may employ one or more combinations of such concepts or components. A proximity sensor may therefore be employed in conjunction with a vibration sensor, and the signal provided by these sensors may be used in isolation (for altering unicycle operation in different ways for example), or may be used together (for confirming a signal from one of the sensors for example).

The invention claimed is:

1. A self-balancing powered unicycle device comprising:
a single wheel;
a drive arrangement adapted to drive the wheel;
a balance control system adapted to maintain fore-aft balance of the unicycle device;
at least one foot platform for supporting a user of the unicycle device;
a handle for lifting the unicycle device;
a usage detection system integrated into the handle and adapted to detect an indication of intended usage from the user and to provide a signal indicative of intended usage, wherein the usage detection system comprises one or more proximity sensors adapted to detect the existence of an entity in close proximity with the one or more proximity sensors; and
a control system adapted to control operation of the unicycle device based on the signal indicative of intended usage from the usage detection system,
wherein the indication of intended usage comprises manipulation of the unicycle device resulting from preparatory action taken by the user prior to onset of the intended usage.

2. The self-balancing powered unicycle device of claim 1, wherein at least one proximity sensor of the one or more proximity sensors employs at least one of: infrared reflection; ultrasonic sensing; microwave sensing; pressure sensing; temperature sensing; capacitive sensing; or light detection to detect the existence of an entity in close proximity with the at least one proximity sensor.

3. The self-balancing powered unicycle device of claim 1, wherein the usage detection system comprises a processing unit adapted to process signals in accordance with an algorithm to determine a user's intended usage of the unicycle device.

4. The self-balancing powered unicycle of claim 1, wherein the unicycle device is devoid of a switch, button, or input interface adapted to receive an indication of usage from the user.

5. A self-balancing powered unicycle device comprising:
a single wheel;
a drive arrangement adapted to drive the wheel;
a balance control system adapted to maintain fore-aft balance of the unicycle device;
at least one foot platform for supporting a user of the unicycle device;
a handle for lifting the unicycle device;
a usage detection system integrated into the handle and adapted to detect an indication of intended usage from the user and to provide a signal indicative of intended usage, wherein the usage detection system comprises one or more proximity sensors adapted to detect the existence of an entity in close proximity with the one or more proximity sensors; and
a control system adapted to control operation of the unicycle device based on the signal indicative of intended usage from the usage detection system,
wherein the indication of intended usage comprises manipulation of the unicycle device resulting from preparatory action taken by the user prior to onset of the intended usage; and
wherein the usage detection system comprises a vibration sensor adapted to detect at least one of a frequency or amplitude of vibration of at least one part of the unicycle device.

6. The self-balancing powered unicycle device of claim 5, wherein the usage detection system is adapted to detect the indication of intended usage based on whether a detected frequency of vibration of at least one part of the unicycle device is within a predetermined range.

7. A self-balancing powered unicycle device comprising:
a single wheel;
a drive arrangement adapted to drive the wheel;
a balance control system adapted to maintain fore-aft balance of the unicycle device;
at least one foot platform for supporting a user of the unicycle device;
a handle for lifting the unicycle device;
a usage detection system integrated into the handle and adapted to detect an indication of intended usage from the user and to provide a signal indicative of intended usage, wherein the usage detection system comprises one or more proximity sensors adapted to detect the existence of an entity in close proximity with the one or more proximity sensors; and
a control system adapted to control operation of the unicycle device based on the signal indicative of intended usage from the usage detection system,
wherein the indication of intended usage comprises manipulation of the unicycle device resulting from preparatory action taken by the user prior to onset of the intended usage; and
wherein the usage detection system is adapted to detect the indication of intended usage based on whether the user manipulates a part or an entirety of the unicycle device in accordance with a predetermined pattern of movement.

8. A usage detection system for a self-balancing powered unicycle device, wherein the usage detection system is adapted to detect an indication of intended usage from a user and to provide a signal indicative of intended usage,
and wherein the indication of intended usage comprises manipulation of the unicycle device resulting from preparatory action taken by the user prior to onset of the intended usage,
and wherein the usage detection system is adapted to be integrated into a handle of a self balancing powered unicycle device,
and wherein the usage detection system comprises one or more proximity sensors adapted to detect the existence of an entity in close proximity with the one or more proximity sensors.

9. The usage detection system of claim 8, further comprising a processing unit adapted to process signals in accordance with an algorithm to determine the user's intended usage of the self-balancing powered unicycle device.

* * * * *